De Mesnil & Eyth.
Towing.

N° 86,737.    Patented Feb. 9, 1869.

Witnesses.
Theo Tusche
J. A. Fraser

Inventors.
Baron Oscar de Mesnil
Max Eyth
per Munn & Co
Attorneys

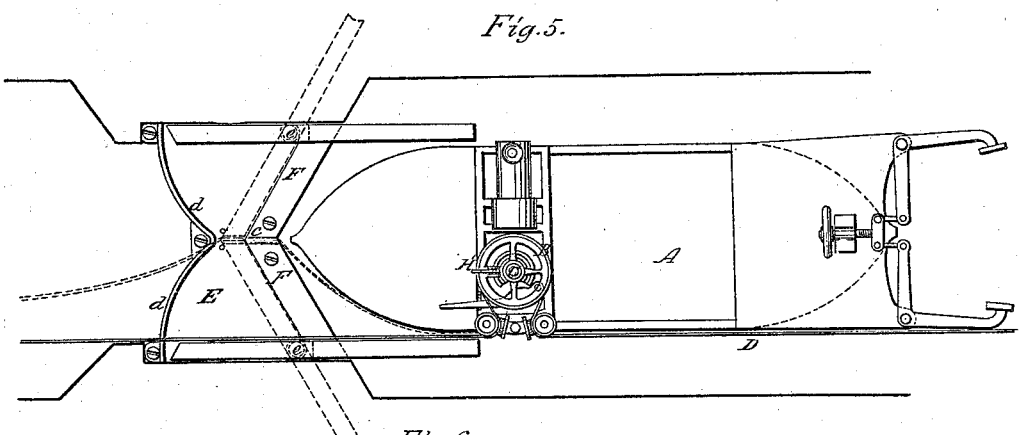
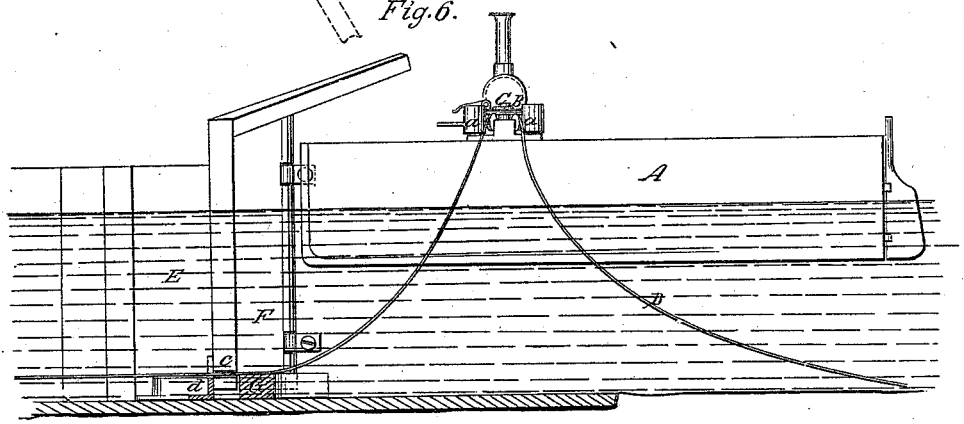
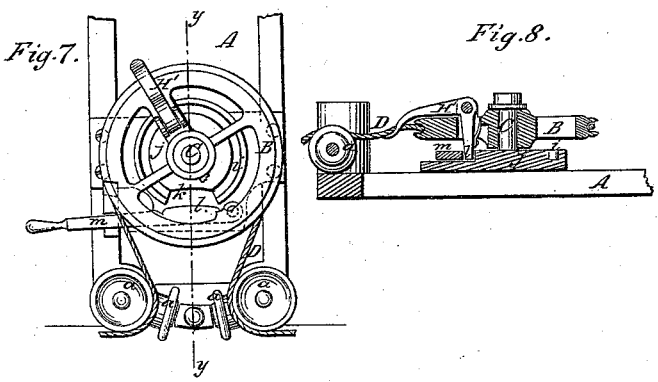

De Mesnil & Eyth.
Towing.

N°86,737. Patented Feb. 9, 1869.

Witnesses.
Theo Tusche.
J. A. Fraser.

Inventors.
Baron Oscar de Mesnil
Max Eyth
Per Munn & Co
Attorneys.

Sheet 4. 4 Sheets.

De Mesnil & Eyth.
Towing.

N° 86,737. Patented Feb. 9, 1869.

Witnesses
Theo Tusche
J. A. Fraser

Inventors.
Baron Oscar de Mesnil
Max Eyth
Per Munn & Co.
Attorneys

BARON OSCAR DE MESNIL, OF BRUSSELS, BELGIUM, AND MAX EYTH, OF STUTTGART, WURTEMBERG.

Letters Patent No. 86,737, dated February 9, 1869.

IMPROVEMENT IN PROPELLING VESSELS ON CANALS.

The Schedule referred to in these Letters Patent and making part of the same.

*To all whom it may concern:*

Be it known that we, Baron OSCAR DE MESNIL, of Brussels, Belgium, and MAX EYTH, of Stuttgart, Wurtemberg, have invented a new and useful Improvement in Propelling Canal-Boats and other Vessels; and we do hereby declare that the following is a full, clear, and exact description thereof, which will enable those skilled in the art to make and use the same, reference being had to the accompanying drawings, forming part of this specification.

This invention relates to a new and improved mode of propelling canal-boats and other vessels with steam as a motor; and It consists in a peculiar application of the power to a wire rope, and in various means or appliances connected therewith, as hereinafter fully shown and described, whereby all the difficulties hitherto attending the success of steam as a motor on canals, rivers, and streams, are successfully obviated.

In the accompanying sheet of drawings—

Figure 1:
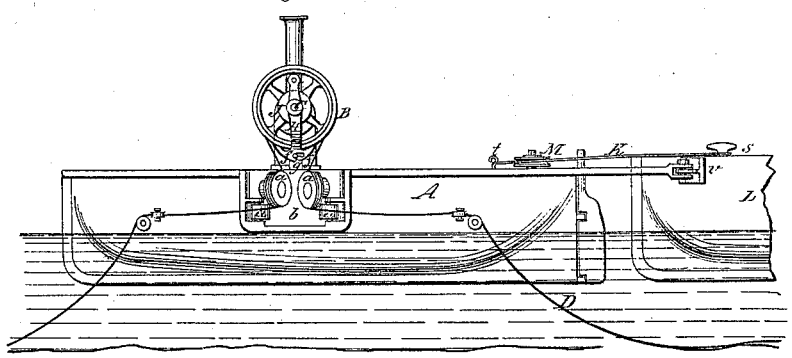

Figure 1, Sheet No. 1, is a side view of a steam-tug and a portion of a canal-boat in tow, and having our invention applied to them.

Figure 2:
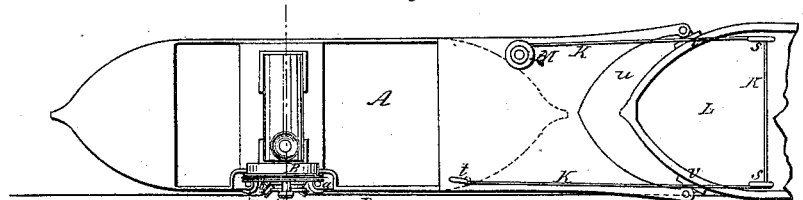

Figure 2, a plan or top view of fig. 1.

Figure 3:
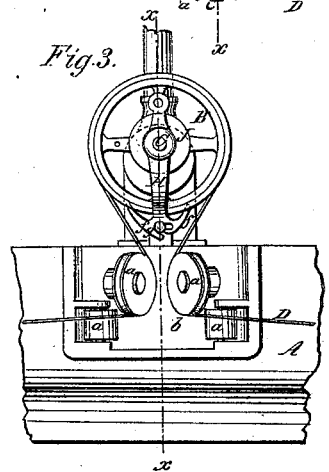

Figure 3, an enlarged view of the drum on the tug, over which drum the wire rope or chain passes.

Figure 4:
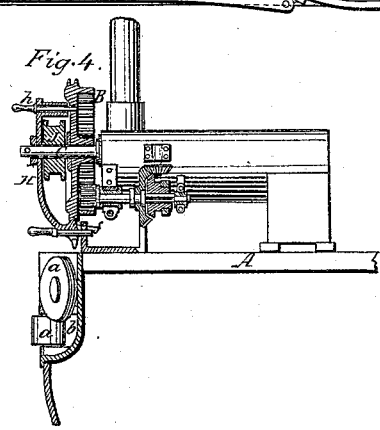

Figure 4, a section of the same taken in the lines *x x*, figs. 2 and 3.

Figure 5, Sheet No. 2, a plan or top view of a modification shown in the figures on Sheet No. 1.

Figure 6, a side view of fig. 5.

Figure 7, an enlarged view of the drum shown in figs. 5 and 6.

Figure 8, a section of the same taken in the line *y y*, fig. 7.

Figure 9:
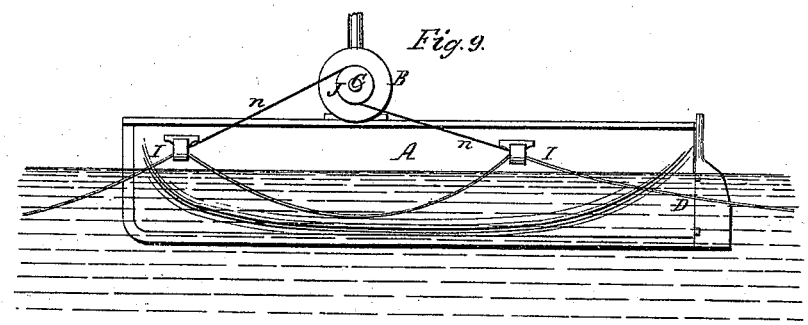

Figure 9, Sheet No. 3, a view of the apparatus for forming the slack in the rope, in order to facilitate the adjustment of the same over the drum.

Figure 10:
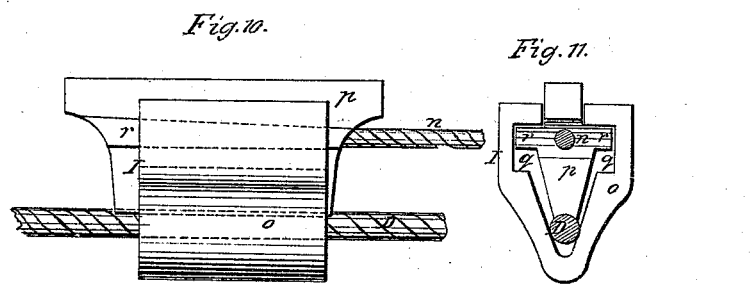

Figure 10, an enlarged detached side view of the gripe or clutch employed with the apparatus for forming the slack in the rope.

Figure 11:
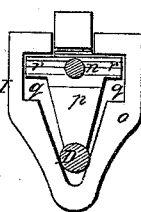

Figure 11, an end view of fig. 10.

Figure 12:
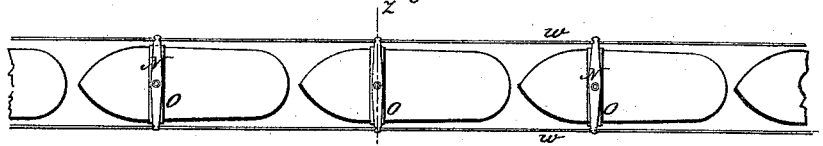

Figure 12, a plan or top view of a series of boats connected together by our improved plan.

Figure 13:
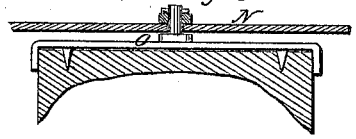

Figure 13, a transverse section of fig. 12, taken in the line *z z.*

Figure 14:
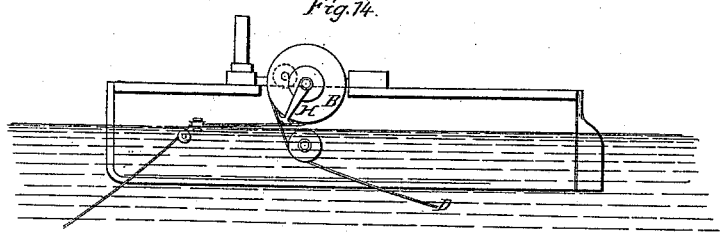

Figure 14, Sheet No. 4, a side view of a tug, showing the operation of the mechanism employed for casting the wire rope from the propelling-drum when required.

Figure 15:
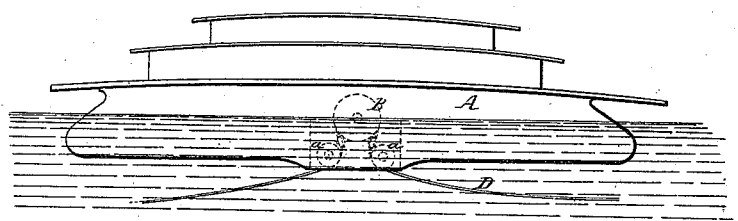

Figure 15, a view, showing a modification in the arrangement or application of the propelling-drum.

Figure 16:
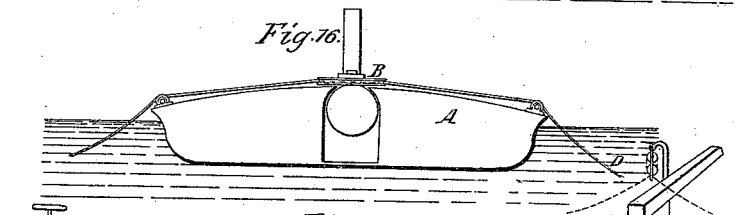

Figure 16, a view, showing another modification in the application of the propelling-drum.

Figure 17:
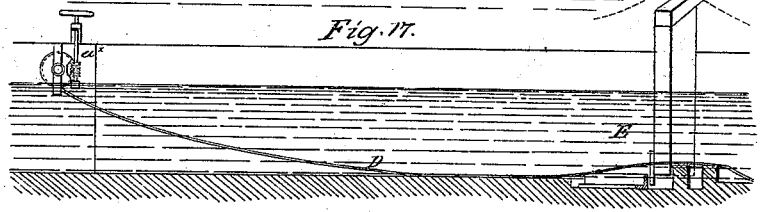

Figure 17, a view, showing the means whereby the wire rope is strained or has its tension regulated to suit circumstances.

Figure 18:
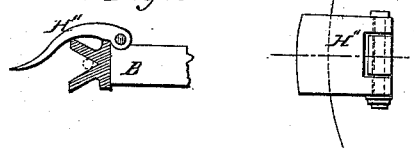

Figures 18 and 19, a view of a modification of the means for throwing the rope off from the propelling-drum.

Similar letters of reference indicate corresponding parts.

A (see drawings on Sheet No. 1) represents a steam-tug, provided with a steam-engine, of any proper or suitable construction, and having a drum, B, placed loosely on a fixed shaft, C, over which a wire rope, D, passes the latter being made to "hug" the periphery of the drum, that is to say, kept in contact with a sufficient portion of its periphery to insure the requisite degree of friction necessary for the propulsion of the tug and boats connected therewith.

This end is attained by guide-rollers, *a a*, as shown clearly in figs. 1 and 3.

The wire rope is submerged in the canal or stream, and secured at both ends, and as the drum B is rotated, the friction of the rope on the drum is designed to be sufficient to cause the boat to be propelled along.

If necessary, however, the drum B may be provided with clips or clamps at its periphery, so arranged as to grasp or "bite" the rope, and insure the propulsion of the boat.

A modification of the application of the drum B is shown in the drawings on Sheet No. 2.

In this arrangement, the drum has a horizontal position, and the guide-rollers *a* are placed on the top or deck of the boat, instead of at the side, as shown in Sheet No. 1.

The former application involves the necessity of a recess or chamber, *b*, being formed in the side of the tug or boat, to receive the guide-rollers *a*, and this is attended with considerable trouble and expense in the building of the tug or boat, and precludes the application of the vertical drum to tugs or boats not built expressly for its use.

The modification exhibited in the drawings on Sheet. No. 2, obviates this difficulty, as will be readily seen.

The rope D is designed to pass through the locks, E, of a canal, and underneath the gates F of the locks, as shown in fig. 6; and in order to prevent the rope being caught between the bottoms of the gates and the side-piece G thereof, the outer edges of the gates have horizontal grooves, *c*, made in them, near their lower ends, one in each gate, to receive and catch the rope as the gates are being closed, two segments, *d d*, being secured to the bottom of the lock, on which the rope rests, and which prevent the latter from sagging and passing underneath the gates, the segments being portions of circles, of which the axes *e* of the gates are centres, and so placed that the outer edges of the gates, in being opened and closed, will just clear them.

By this arrangement, as the gates are closed, the rope will be pressed toward the centre of the side-piece G, and will remain between the edges of the two gates while the same remain in a closed state. (See fig. 5.)

It is designed to have one end of the rope D connected to a windlass, operated by a screw and worm-wheel, as shown in red in fig. 16 at $a^\times$.

By this simple arrangement, the rope may be kept at a proper degree of tension at all times, and this is an important feature, in a practical point of view, as the rope requires to be let out when there are many tugs or boats applied to or connected with it, for a considerable length of rope is taken up by its passage around the propelling-drums.

As tugs or boats are detached from the rope, the latter will require to be tightened, to take up the slack caused thereby.

In order to cast the rope off from the propelling-drums, which is often required, to allow one tug or boat to pass another, and also for other purposes, the following apparatus is employed:

On the outer end of the shaft C, (see Sheet No. 1,) there is fitted loosely an arm, H, one end of which is curved inward, and provided with two prongs $f f$, the outer ends of which fit in the groove in the periphery of the drum, in which groove the rope works.

The space between the prongs $f f$, forms an eye, $g$, to catch the rope.

This forked end of the arm, when not in use, is in contact with the lower part of the drum, owing to the superior gravity of that end of the arm, and in consequence of the arm being fitted loosely on the shaft, and not turning with the drum. (See figs. 1, 3, and 4.)

When the rope is to be cast off, the end of the arm opposite to that provided with the prongs $f$, has a pin, $h$, (see fig. 4,) passed through it, said pin extending into the drum, and securing the arm to the latter, so that the arm will rotate with the drum, and the pronged end of the arm pass underneath the rope, so as to cast the latter from the drum. (See fig. 14.)

In Sheet No. 2, a modification of this casting-off apparatus is shown, a bent lever or arm, H', being attached to the horizontal drum B, the upper arm extending beyond the periphery of the drum, and curved downward, as shown clearly in fig. 8, and the inner arm extending downward into an annular groove, $i$, in a fixed plate, $j$, underneath the drum.

This groove $i$ is not continuous, or does not form a complete circle, a break, $k$, being in it to allow a curvature, $l$, on a pivoted bar, $m$, being adjusted into the groove, said curvature, when thus adjusted, causing the inner arm to be forced inward or backward, and the upper arm consequently forced downward, so that it will catch underneath the rope, (see fig. 8,) and cast the same off from the drum.

Another modification of this casting-off apparatus is shown in figs. 18 and 19, the latter consisting simply of a hinged bar, H'', which may be adjusted over the drum B, as shown in fig. 18, so as to cast off the rope, or be turned outward or backward, so that it cannot come in contact with the rope.

In order to avoid any difficulty in applying the rope to the propelling-drum, an apparatus is employed for forming a slack in the rope.

This apparatus, (see figs. 10 and 11,) consists of two clamps I I, to which supplemental ropes or chains $u u$, are attached, the latter being connected to opposite sides of a pulley, J, fitted on the shaft C, outside of the drum B, and connected therewith. (See fig. 9.)

The clamps I I are each composed of two parts, $o p$, the part $o$ being what may be termed a shell, being of V-shape at its lower part, (see fig. 11,) and having a taper groove, $q$, in the inner surface of each side, to receive cleats $r$, of corresponding shape, at each side of the part $p$ in which the ends of the ropes or chains $u u$ are secured.

The lower edges of the part $p$ are grooved or hollowed out in semicircular form, and the parts or shells $o$ of the clamps are fitted on the rope D, and the parts $p$ fitted in the parts $o$, the cleats $r$ of $p$ fitting in the grooves $q$ of $o$, and in consequence of the grooves and cleats being of taper or wedge-form, or shape, the pull of the supplemental ropes or chains $u u$, on the parts $p$, caused by the winding up of said ropes or chains on the pulley J, will cause the lower edges of $p$ to bind or clutch the rope D firmly, and form a slack in the same, which will admit of it being readily adjusted on drum B.

This pulley, or pulley-drum, is also advantageously used for hauling boats through locks, and also for hauling boats of a train or series together, a suitable rope or chain being attached to the pulley-drum for that purpose.

In attaching boats to the tug, and to one another, a rope or chain-connection may be used, as shown in Sheet No. 1, K representing the rope or chain passing around hooks or pins $s$, on the boat L, and attached to a hook, $t$, on the tug, the opposite end of the rope or chain being connected to a windlass, M, on the tug.

The bow of the boat is fitted in a recess, $u$, corresponding in shape to the bow of the boat, and having pivoted plates $v v$ attached to its ends, which serve as bearings for the boat L. (See figs. 1 and 2.)

For connecting a series of canal-boats together, two lines $w w$ are employed, as shown in fig. 12.

These lines are attached to the ends of swivel-bars N, which are pivoted centrally to bars O, the latter being fitted transversely on the boats at some distance from their bows. (See fig. 13.)

By this arrangement, the boats are allowed to turn freely, and conform to the sinuosities of the canal, without getting out of line, as would be the case were they connected by a single rope, chain, or line.

In certain cases, it might be preferable to have the rope D pass over the deck of the tug, instead of having it at one side of the same, and in this instance, the rope may pass over guide-rollers on the tug, as shown in fig. 16, and in certain cases, the propelling-drum B may be placed in the hold of the tug, as shown in fig. 15, in which case the rope D will be entirely out of the way.

It will be seen, from the above description, that the invention is applicable not only for propelling canal-boats, but also for ferry-boats on streams capable of having a submerged rope or chain stretched across them, and the invention will also be serviceable in streams where there are rapids, as a wire rope may be submerged in the rapids, and boats enabled to pass through or over them without any difficulty whatever.

We claim as new, and desire to secure by Letters Patent—

1. The casting-off apparatus, consisting of an arm, H, H', or H'', attached to or connected with the propelling-drum B, or its equivalent, and arranged substantially as shown and described, so that, by a simple adjustment, the arm may be thrown in contact with the rope, and, by the revolution of the drum, cast off the rope from the latter.

2. The clamps I I, constructed and applied to the rope D, in connection with the pulley J and supplemental ropes $n n$, or an equivalent means, for the purpose of forming or producing, when required, a slack in the rope D, to facilitate the placing of the rope on the drum.

3. The two segments $d d$ at the bottom of the lock E, in connection with the grooves $c$ in the edges of the gates F, all arranged substantially as and for the purpose specified.

4. The swivel-bars N, in combination with the lines $w w$, all arranged and applied substantially in the manner as and for the purpose set forth.

The above specification of our invention signed by us, this 14th day of October, 1867:

BON. OSCAR DE MESNIL.
MAX EYTH.

Witnesses:
WM. F. MCNAMARA,
ALEX. F. ROBERTS.